May 5, 1970          A. E. GEALT          3,510,421
POLAROGRAPHIC CELL
Filed June 12, 1967
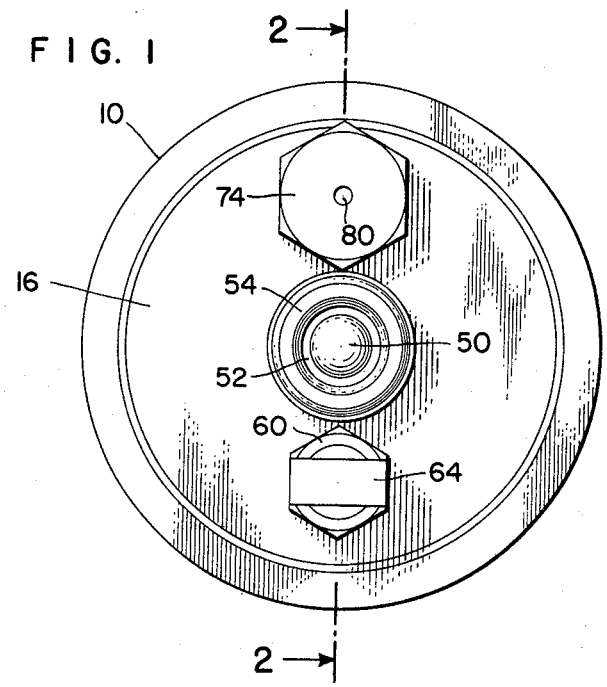
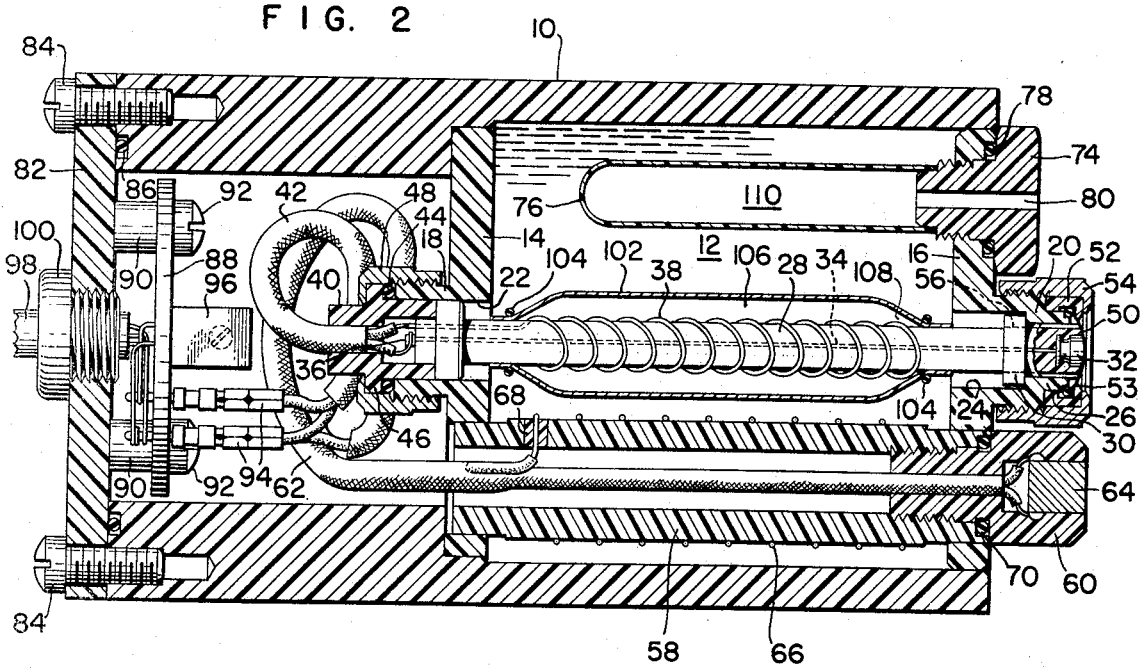
INVENTOR.
ARTHUR E. GEALT
BY M. Michael Carpenter
ATTORNEY.

United States Patent Office 3,510,421
Patented May 5, 1970

---

3,510,421
POLAROGRAPHIC CELL
Arthur E. Gealt, Philadelphia, Pa., assignor to Honeywell, Inc., Minneapolis, Minn., a corporation of Delaware
Filed June 12, 1967, Ser. No. 645,107
Int. Cl. G01n 27/54, 27/46
U.S. Cl. 204—195    5 Claims

ABSTRACT OF THE DISCLOSURE

A polarographic cell is shown for measuring the amount of dissolved oxygen within a fluid having first and second electrode arranged within a hollow cylindrical housing closed by a cover plate at each end for forming a chamber. The first electrode mounts on the end of a rod extending through the chamber, while the second electrode is helically wound about the rod within the chamber. A cylindrical filter attached at each end to the outer surface of the rod encloses the second helical electrode. Passage of current through the electrolyte within the chamber causes the gradual deterioration of the helical electrode whereby the insoluble particles thus precipitated are trapped by the subchamber formed by the filter. This prevents the particles from entering the electrolyte within the chamber and causing an obstruction in the area of the first electrode. A differential pressure bladder is arranged within the electrolyte having an inner enclosure which communicates with the fluid containing the dissolved oxygen. A temperature sensitive resistance element is arranged within the fluid next to the first electrode. A third electrode is arranged within the electrolyte for trapping oxygen initially dissolved therein.

---

The present invention relates to a polarographic cell and, more particularly, to a reducible gas detecting polarographic cell and, more particularly, to a reducible gas detecting polarographic cell.

A polarographic cell provides a method of quantitative analysis based on the current/voltage curve produced by the cell during electrolysis of a solution with a steadily increasing electromotive force. Polarographic cells which are capable of analyzing the amount of a reducible gas within a solution, as for example oxygen within water, are well known in the art. A typical example is U.S. Pat. No. 3,235,477 by Allen H. Keyser et al., issued Feb. 15, 1966, and assigned to the same assignee as a present invention. Polarographic cells of this class are subject to loss of output current over an extended time period. The cause of this output current loss is due to the build up of particles formed from insoluble precipitates within the electrolyte which eventually limit the flow of electrolyte between the electrodes within the polarographic cell. Prior art polarographic cells also experience difficulty when used as a totally immersable sensing element. In such an arrangement corrections for pressure and temperature are required which must be accurate and responsive. Finally, prior art polarographic cells have displayed inaccuracies in their output current during the initial use thereof. The inaccuracies are caused by a drift in the initial output current.

Accordingly, it is an object of the present invention to provide an improved polarographic cell for detecting a dissolved reducible gas.

Another object of the invention presented herein is to provide an improved dissolved oxygen detector using a polarographic cell technique.

Still another object of this invention is to provide a polarographic cell which will operate efficiently for an extended period of time without being subjected to a buildup of cell resistance and subsequent loss of cell output current.

A further object of the present invention is to provide a polarographic cell for detecting a dissolved reducible gas within a fluid, at a substantial depth, which will automatically compensate itself for pressure as well as for variations in temperature.

Yet a further object of the present invention is to provide a polarographic cell which is free of unwanted variations in output current during the initial periods of cell operation.

Other objects and many of the attendant advantages of the present invention will become readily apparent to those skilled in the art as a better understanding thereof is obtained by reference to the following description when considered in connection with the accompanying drawings, wherein:

FIG. 1 is a bottom plan view, showing a polarographic cell of the present invention; and FIG. 2 is a cross-sectional view taken along line 2—2 of FIG. 1.

Referring now to the drawings, there is shown a polarographic cell embodying the present invention and comprising an electrically insulating and chemically inert, hollow cylindrical housing 10 constructed from a suitable material, as for example polyvinyl chloride. The hollow cylindrical housing 10 is relieved inwardly from its lowermost surface, shown at the right of FIG. 2 and described in that manner hereinbelow, for forming a chamber 12 therein. The left-hand portion of the chamber 12 is closed by a center plate 14 which fits against shoulder formed by the inwardly relieved chamber 12. The center plate 14 is constructed from an electrically insulating material, such as polyvinyl chloride, and attached to the hollow cylindrical housing 10, as by solvent welding. Solvent welding is carried out by placing two members of similar material in a contacting relationship and applying a fluid, in which the members are mutually solvent, to the contact. The solvent will dissolve the members and allow them to reharden into a continuous weld at the point of solvent application. The lowermost or right-hand end of the chamber 12 is closed with an end plate 16 which fits into the inner diameter thereof and is constructed from a suitable insulating material which will permit solvent welding with the housing 10. The center plate and end plate, 14 and 16, are provided with central hub portion 18 and 20, respectively, which extend outwardly away from the chamber 12. The central hubs are inwardly relieved along their longitudinal axis for forming apertures 22 and 24 respectively therein. Aperture 24 is provided with an inwardly extending collar 26 which forms a shoulder within the aperture 24. A cylindrically hollow mandrel 28 is positioned within the apertures 22 and 24 with its lowermost or right-hand end terminating beyold the hub 20 of the end plate 16. A collar 30 on the mandrel abuts against the shoulder formed by collar 26 for positioning a first electrode, in the form of a cathode button 32, which is located at the right-hand end of the mandrel 28. The cathode button 32 may be formed from a precious metal, such as gold. An electrode wire 34, constructed of the same precious metal as the cathode button 32, extends through the cylindrically hollow center of the mandrel 28 and terminates at the end thereof where a brass collar 36 is crimped to the wire 34. The cylindrically hollow mandrel 28 is then filled with a suitable nonconductive material, such as epoxy, for insulating the wire 34 therein. A second electrode, in the form of an anode wire 38, is helically wound about the outer surface of the mandrel 28 along the entire length thereof which passes through the chamber 12. The anode wire may be constructed from a precious metal, such as silver, with its left-hand end passing through the mandrel 28 for terminating above the end surface thereof. A plug member 40 having a biconductor cable 42 passing therethrough, is placed over the left-hand end of the mandrel 28. The biconductor cable 42, plug member 40, and mandrel 28 are constructed from the same nonconductive material. The conductors within the biconductor cable 42 are connected to the electrode wires 34 and 38 and the entire assembly is then solvent welded into a single unit. An O-ring 44 is placed under a collar 46 of the plug member 40, and an internally threaded clamping nut 48 is threaded upon the external threads of the hub 18 thus providing a sealing engagement therebetween.

A selectively permeable membrane 50, which is selectively permeable to dissolved reducible gas (such as oxygen), is stretched across the surface of the cathode button 32 and attached at its periphery to a membrane mounting ring 52. The membrane may be constructed from many suitable materials, such as fluorinated ethylene propylene. The membrane mounting ring 52 fits over the end of the hub 20 of the end plate 16 and an O-ring 53 is provided for sealing the cathode button 32 from the exterior. A second internally threaded clamping nut 54, identical to the nut 48, is threaded upon the external threads of the hub 20 for clamping the membrane 50 and its clamping ring 52 in a sealing engagement. The cathode button 32 communicates with the chamber 12, in which the anode 38 is located, through a plurality of grooved channels 56 which pass along the lower most portion of the mandrel 28 and through the collar 30 associated therewith.

The center plate and end plate, 14 and 16, are provided with apertures which are axially aligned along a parallel axis, offset from the longitudinal axis of the housing 10. A temperature compensating assembly, formed from a hollow cylindrical rod 58, is inserted into the aperture and attached thereto by suitable means, such as solvent welding. An external plug 60, having a reduced threaded portion, is threadably attached to the right-hand end of the cylindrical rod 58. A triconductor cable 62 passes through the hollow portion of the cylindrical rod 58 and into the external plug 60. A resistive element, such as the thermistor 64, is potted into the external surface of the plug 60 with two of the three wires within the triconductor cable 62 attached to opposite surfaces thereof, as by soldering. A third electrode, in the form of an auxiliary cathode 66, is helically wound about the outer surface of the cylindrical rod 58. The auxiliary cathode may be constructed from a precious metal wire, such as gold. The left-hand end of the auxiliary cathode wire 66 passes through a suitable seal 68 within the side of the cylindrical rod 58 and is attached to the third wire of the triconductor cable 62. An O-ring 70 is provided for sealing the right-hand portion of the cylindrical rod 58 at the point where the external plug 60 is threadably attached thereto.

The end plate 16 is internally threaded for receiving a pressure compensating assembly. The pressure compensating assembly includes an externally threaded nut 74 and a bladder member 76. The nut 74 and bladder 76 are constructed from the suitable insulating material, such as polyvinyl chloride, and are combined into an integral assembly, as by solvent welding. An O-ring 78 is provided for establishing a sealing engagement between the chamber 12 and the nut 74. An aperture 80 passes through the center of the externally threaded nut 74 for allowing the inner chamber formed by the bladder 76 to communicate with the exterior of the polarographic cell.

The left-hand end of the hollow cylindrical housing 10 is closed by a second end plate 82 secured to the housing 10 by a plurality of clamping means, such as screws 84. The second chamber thus formed is sealed by a suitable O-ring 86. A terminal board 88 is attached in spaced relationship to the inner surface of the end plate 82 by a plurality of standoffs and screws 90 and 92, respectively. The biconductor cable 42 and the triconductor cable 62 are attached to suitable terminals 94 which mount upon the terminal board 88. A trimming resistor 96 is also mounted upon the terminal board 88 with its lead attached to the terminals 94. The center of the end plate 82 is provided through with an aperture through which a main cable 98 passes. The conductors within the main cable 98 are suitably attached to the terminal 94, and a molded collar 100 is provided for atttaching the main cable 98 to the end plate 82. The insulating material of the main cable 98, the molded collar 100, and the end plate 82 are suitably attached, as by solvent welding.

A tubular filter element 102 is coaxially arranged about the mandrel 28 with its opposite ends constricted toward the mandrel and sealed thereagainst by suitable O-ring 104. The tubular filter thus forms a subchamber 106 about the helically wound anode 38. This filter is effective to freely pass an electrolyte within the chamber 12. The chamber 12 is filled with an electrolyte which completely immerses the anode 38 and communicates through the aperture 24 and grooved channels 56 to the area of the cathode button 32. The electrolyte may consist of a solution of one-half normal potassium hydroxide and two normal potassium chloride when the reducible gas being tested for is oxygen. Obviously, other electrolytes and electrodes may be utilized for testing for other gases.

In polarographic cells, the interaction of the electrolyte with the electrodes cause the formation of insoluble precipitates, such as silver chloride, which flake away from the anode and fall under the influence of gravity toward the cathode. As can be seen in FIG. 2, these insoluble precipitates could clog the fluid passages 56 between the chamber 12 and the cathode button 32. Accumulation of particles in this area agglomerate to a dense film which reduces the ability of the electrolyte to flow between the anode and the cathode and increases the cell resistance for reducing cell output current. The reduced cell output causes the polarographic cell to lose its calibration and eventually become inoperative. This has been found to be true in prior art polarographic cells provided with filters where no provision has been made to trap the insoluble precipitates once the filter has caused their concentration. In these prior art devices, the insoluble precipitates eventually clog the polarographic cell in the area of its filter. The arrangement of the present invention allows an increase filter area for the electrolyte at the same time, arranges the filter such that the insoluble precipitates, silver chloride particles are trapped in a pocket 108 at the right-hand, or lowermost portion of the filter. Here their caking does not clog the cell to offer resistance to the passage of ions between the anode and cathode.

In operation, the sample solution containing a dissolved reducible gas, such as oxygen, is brought into contact with the selectively permeable membrane 50 covering the cathode button 32. This may be achieved by immersing the polarographic cell either partially or totally within the solution. It is well known in the art that motion of the sample solution over the membrane 50 is necessary to replenish the solution consumed by the cell. The molecular oxygen from the sample solution permeates the selectively permeable membrane 50 that is arranged to have particular ability to pass oxygen molecules. The oxygen passes into the electrolyte solution in the vicinity of the cathode button 32. In order to establish a reduction of the oxygen in the electrolyte, the cathode button 32 has been made of gold while the anode associated therewith has been made of silver. The potasium hydroxide potassium chloride solution which forms the electrolyte is effective to stabilize the concentration of the alkaline electrolyte because of the electrochemical equivalence between the regeneration of a hydroxyl ion at the gold cathode and the concurrent utilization at the silver anode. The reduction of the oxygen, in accordance with the principles well known in the art, is effective to establish a level of conductivity between the cathode 32 and the anode 38. Accordingly, if the cell of the present invention is included in a circuit to establish a current path through the electrolyte between the electrode elements 32 and 38, the resultant current flow is proportional to the diffusion flow of oxygen through the membrane from the sample solution.

The chemical reaction of the silver anode 38 is effective to produce a precipitation of silver chloride particles. As described hereinabove, the migration of these particles, if unchecked, would tend to restrict the fluid path of the cell. These effects would contribute a marked instability and deterioration of the oxygen detecting capacity of the cell. The filter 102 of the present invention is interposed in the fluid path between the silver and and gold electrodes to prevent the aforesaid migration of silver chloride particles toward the gold cathode. The filter 102 may be constructed from a polyester film supported upon a cloth substrate formed from a suitable material, such as polyamide. As indicated hereinabove, the filter is advantageously located about the anode 38 for retaining the insoluble precipitates within subchamber 106 and preventing them from entering the main portion of chamber 12. Further, the filter arrangement provides the pocket 108 for trapping the insoluble precipitates and concentrating them for preventing a premature failure of the polarographic cell.

The current measurement obtained from the cell, as an indication of the oxygen concentration, depends on certain fixed structural dimensions of the cell, such as the thickness of the selectively permeable membrane 50 and the surface area of the cathode button 32. In addition, it has been found that the current flow is dependent on the temperature of the sample solution. Accordingly, the aforesaid current measurement must be coordinated with the temperature of the solution being tested to assure an accurate measurement. The polarographic cell of the present invention includes a means for effecting an automatic temperature compensation. A thermistor 64 is mounted in contacting association with the sample solution. In prior art devices, this thermistor was located within the main body of the polarographic cell. The present invention places the thermistor in direct contact with the sample solution and in close proximity to the selectively permeable membrane. Thus, the temperature of the sample solution is communicated directly to the thermistor. The thermistor 64 is arranged, in combination with the trimming resistor 46, to have a temperature coefficient equal and opposite that of an uncompensated cell. Accordingly, any temperature-induced variation in the current flow of the cell may be cancelled by introducing the thermistor 64 in an external current measurement circuit by means of the two wires of the triconductor cable 62.

As the preferred embodiment of the polarographic cell has been designed for submersible operation, it is necessary to provide pressure compensating means. The pressure compensating assembly, formed by the nut 74 and bladder 76, provides an inner chamber 110 which communicates directly with the sample solution. As the polarographic cell is submerged into the sample solution, the fluid passes through the aperture 80 within the nut 74 into the chamber 110. Through this arrangement an increasing fluid pressure of the solution causes the outward expansion of the bladder 76 for providing a corresponding increase in the pressure of the electrolyte within the chamber 12. Thus, there has been provided a means for compensating for the pressure of the solution as the polarographic cell is lowered therein. Without compensating as described, the external pressure of the sample solution would increase, becoming substantially greater than the internal pressure of the electrolyte. This pressure differential tends to compress the membrane 50 against the face of the cathode button 32 thus closing the electrolyte fluid passage therebetween and, thereby, decreasing the current output of the polarographic cell. At some point, the pressure difference causes the rupture of the permeable membrane 50 and the ultimate failure of the polarographic cell.

It has been found in prior art polarographic cells that the first calibration thereof is often inaccurate due to the initial drift of the output current. One cause of this drift is the presence of reducible gas within the electrolyte solution itself. It has been found that this initial drift can be eliminated by the addition of a third electrode, in the form of a second cathode 66 within the chamber 12. This second cathode acts as a "getter" for attracting the reducible gas, such as oxygen, within the electrolyte. The second cathode rapidly ionizes and depletes the oxygen within the chamber 12, but the current path in this circuit will not develop an output voltage to interfere with that of the measuring cathode 32. With this ararngement, the polarographic cell of the present invention is quickly freed of its initial drift and a first calibration may be made which is completely accurate.

Obviously, many modifications and variations of the present invention will become apparent to those skilled in the art in light of the above teachings; and it should therefore be understood that the embodiments described hereinabove are illustrations rather than limitations of the present invention. Consequently, the present invention should be limited only by the appended claims.

The embodiments of the invention in which an exclusive property or privilege is claimed are defined as follows:

1. In a polarographic cell for measuring the concentration of a dissolved reducible gas in a solution, including an electrically insulating and chemically inert housing means having a generally hollow cylindrical shape for forming an electrolyte chamber therein, mandrel means passing through the longitudinal axis of said electrolyte chamber, first electrode means attached to the end of said mandrel means and disposed outside said electrolyte chamber, second electrode means wound about said mandrel means and disposed within said electrolyte chamber for total immersion within a fluid contained therein, said inert housing means having channel means communicating between said first and second electrode means for providing an electrical current bridge therebetween, and a membrane selectively permeable to said dissolved reducible gas attached over said mandrel means for separating said first electrode from said solution, wherein the improvement comprises:
   tubular filter means arranged to allow said wound second electrode on said mandrel means to pass therethrough;
   said tubular filter means constricted at each end for sealably mounting against said mandrel means and for forming a subchamber enclosing said wound second electrode therein;
   said tubular filter means effective to freely pass said fluid within said electrolyte chamber while retaining insoluble precipitates within said subchamber thereby preventing their entrance into said electrolyte chamber and said channel means for maintaining the free flow of said fluid therein between said electrode means;
   temperature compensating means supported by said inert housing means outside said electrolyte chamber in side-by-side relationship with said first electrode means and in direct contact with said solution; and
   electrical trimming means mounted within said housing for trimming said temperature compensating means;
   whereby said polarographic cell is compensated for temperature and said measurement thereof does not drift due to said insoluble precipitates within said channel means.

2. A polarorgraphic cell as claimed in claim 1 additionally comprising pressure compensating means supported within said electrolyte chamber by said inert housing means including bladder means and means for supportably connecting said bladder means to said inert housing means having an aperture therein for communicating with said solution whereby the pressure of said solution reacts through said bladder means for compensating the pressure of the fluid within said electrolyte chamber.

3. A polarographic cell as claimed in claim 2 wherein said temperature compensating means comprises a temperature sensitive resistive element, said electrical trimming means being connected to said resistive element for comprensating the measurable output of said cell with respect to solution temperature, and said cell additionally comprises a two wire conductor means over which said polarographic cell provides said measurable output.

4. A polarographic cell for measuring the concentration of a dissolved reducible gas in a solution, comprising:
- an electrically insulating and chemically inert housing means having a generally hollow cylindrical shape for forming an electrolyte chamber therein;
- mandrel means passing through the longitudinal axis of said electrolyte chamber;
- first electrode means attached to the end of said mandrel means and disposed outside said electrolyte chamber;
- second electrode means wound about said mandrel means and disposed within said electrolyte chamber for total immersion within an electrolyte fluid contained therein;
- said inert housing means having channel means communicating between said first and second electrode means for providing an electrical current bridge therebetween;
- a membrane selectively permeable to said dissolved reducible gas attached over said mandrel means for separating said first electrode from said solution;
- tubular filter means arranged for passing said wound second electrode on said mandrel means therethrough at each end;
- said tubular filter means for sealably mounting against said mandrel means, forming a subchamber enclosing said second electrode therein;
- said tubular filter means effective to freely pass said electrolyte fluid within said electrolyte chamber while retaining insoluble precipitates within said subchamber thereby preventing their entrance into said electrolyte chamber and said channel means for maintaining the free flow of said fluid therein between said electrode means;
- second mandrel means passing through said electrolyte chamber;
- temperature compensating means supported within said second mandrel means and exposed to said solution in side-by-side relation with said second electrode means; and
- pressure compensating means mounted within said electrolyte chamber including bladder means and means for connecting said bladder means to said housing means having an aperature therein for communicating with said solution;
- whereby said polarographic cell is compensated for pressure and temperature and said measurement thereof does not drift due to said insoluble precipitates within said channel means.

5. A polarographic cell as claimed in claim 4 additionally comprising a third electrode wound about said second mandrel means and disposed directly within said electrolyte chamber for initially removing unwanted reducible gas from said electrolyte fluid within said electrolyte chamber, whereby said measurement of said polarographic cell does not drift due to the presents of said reducible gas within said electrolyte fluid.

References Cited

UNITED STATES PATENTS

| 2,595,042 | 4/1952 | Wyllie | 204—195 |
| 2,930,967 | 3/1960 | Laird et al. | 204—195 |
| 3,070,539 | 12/1962 | Arthur et al. | 204—195 |
| 3,235,477 | 2/1966 | Keyser et al. | 204—195 |
| 3,278,408 | 10/1966 | Leonard et al. | 204—195 |
| 3,322,662 | 5/1967 | Mackereth | 204—195 |
| 3,328,277 | 6/1967 | Solomons et al. | 204—195 |
| 3,406,109 | 1/1968 | Molloy | 204—195 |
| 3,410,778 | 11/1968 | Krasberg | 204—195 |

FOREIGN PATENTS 458,218  12/1936  Great Britain.

Ta Hsung Tung, Primary Examiner

U.S. Cl. X.R.

204—282